3,021,060
CALCULATING MACHINE
Walter Edward Mathi, Oakland, and George Vladislav Nolde, Santa Monica, Calif., assignors to Smith-Corona Marchant Inc., a corporation of New York
Filed June 6, 1958, Ser. No. 740,335
1 Claim. (Cl. 235—79)

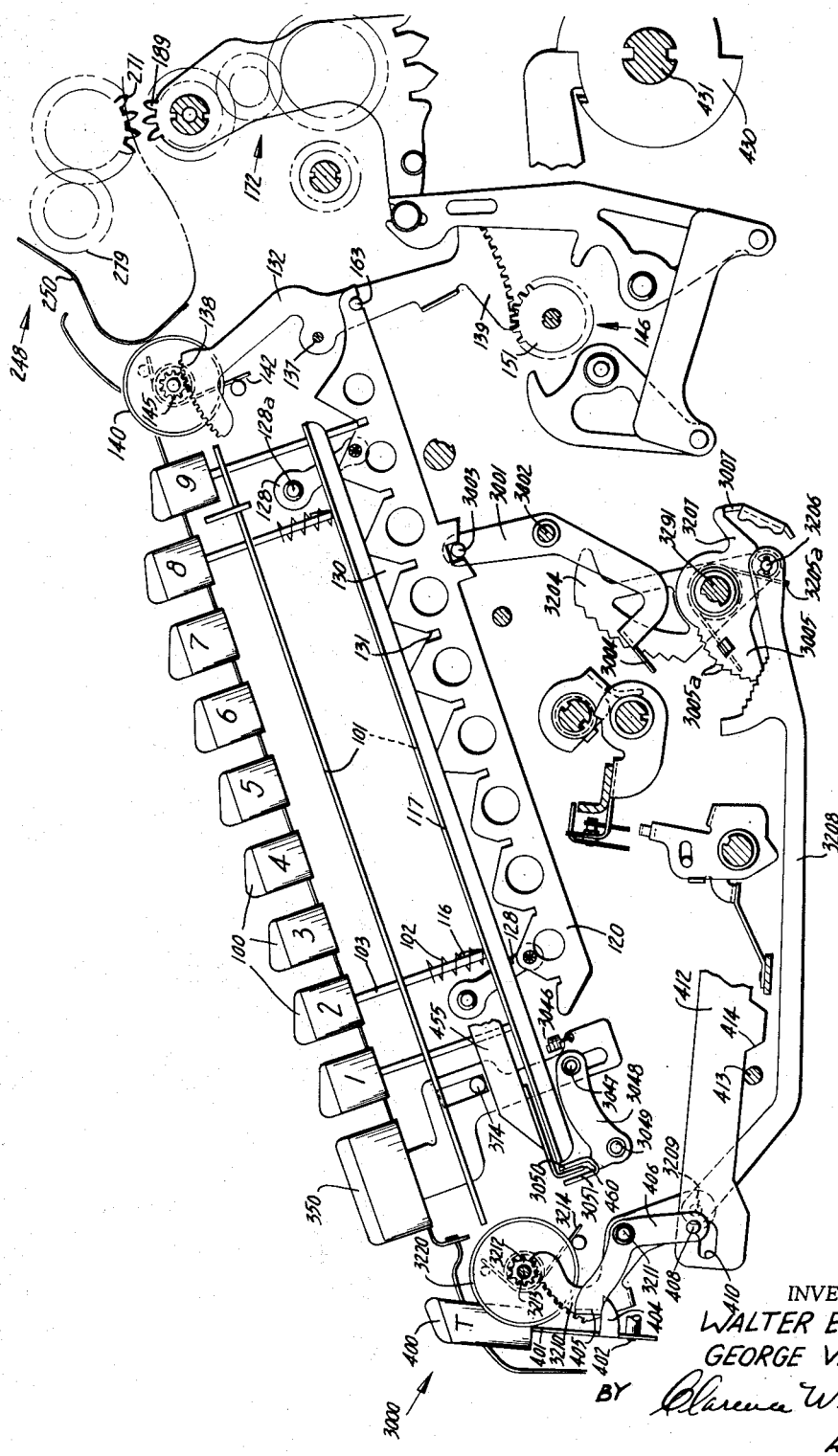

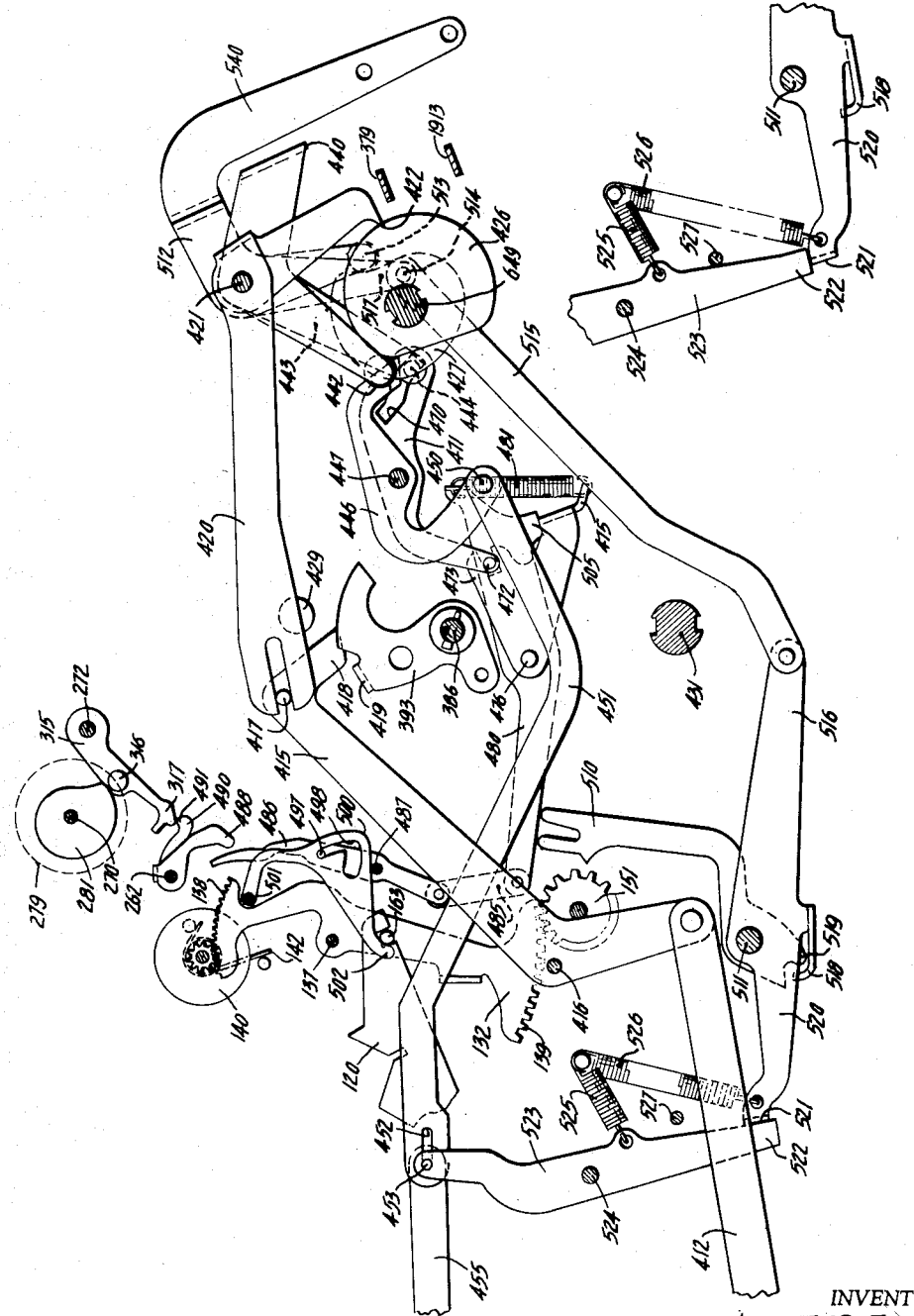

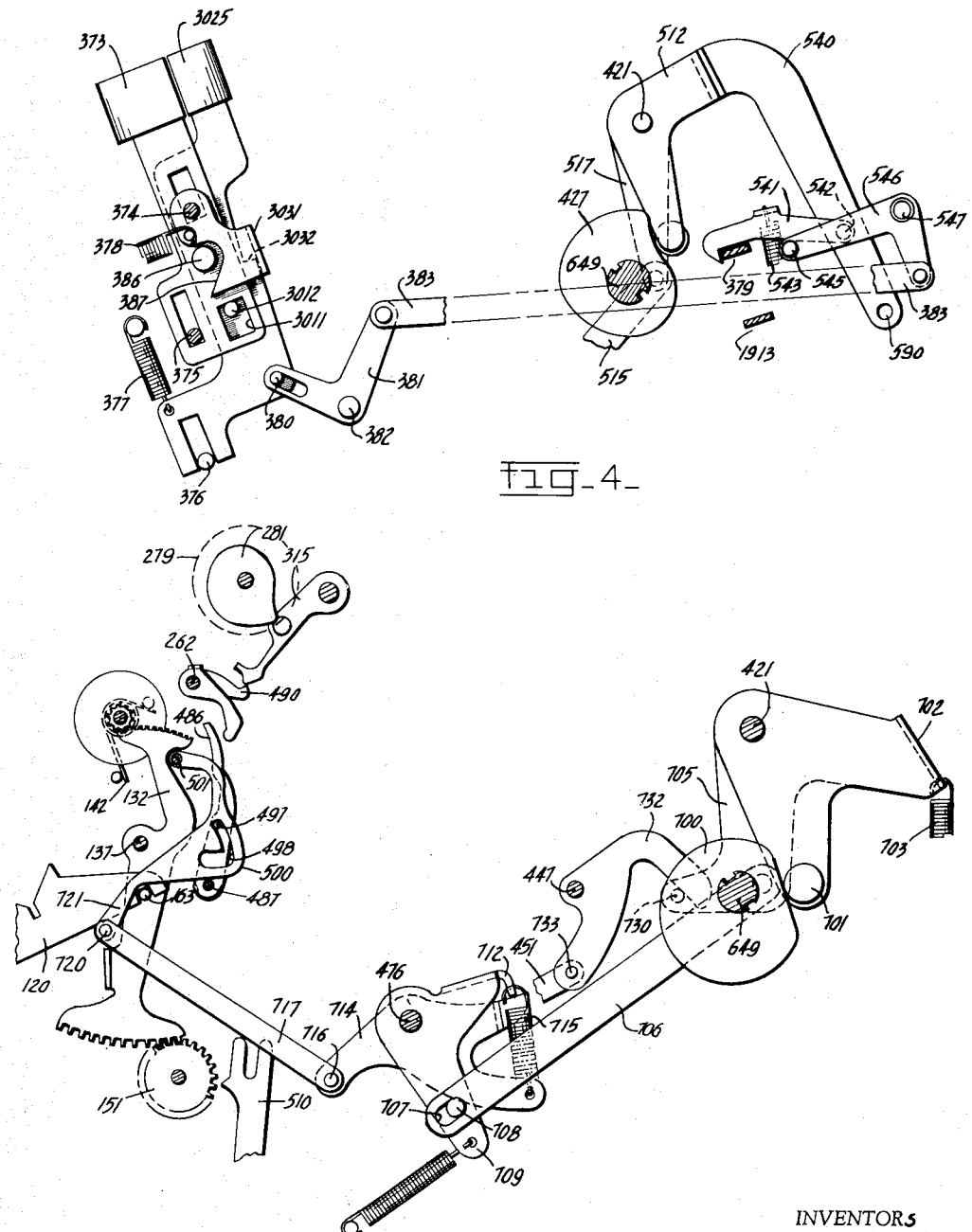

The invention relates to calculating machines and more particularly concerns a back transfer mechanism for transferring a value from a register to a value entry device or to a value storage device.

Back transfer mechanisms in calculating machines permit the operator to transfer a value, for example, a product, from an accumulator register to the value entry mechanism associated with the keyboard in response to depression of a transfer key. The product value may then be used as an operand value. Such back transfer mechanisms eliminate the human error possibly involved in transposing the value from the register to the value entry device by copying, as well as saving time and motion.

It will also be apparent that an operator may not want to immediately use the transferred value but may wish to store this value for future use, while performing intermediate calculations. A machine according to the invention therefore may provide an auxiliary key for transferring the value to a storage device. The transferred value, for instance the product in the example above, is retained in the value storage mechanism while other calculating operations are performed and may be used when desired by the operator.

It is an object of the invention to transfer a value from a register to a value entry mechanism in response to depression of a transfer key, and selectively, to transfer said value from said value entry mechanism to a value storage mechanism in response to depression of a control key.

It is a further object of the invention to transfer a value from a crawl carry register to a value entry mechanism in response to depression of a transfer key, and to disable the normal operation of said transfer key during predetermined intervals of operation of said crawl carry register.

It is a further object of the invention to transfer a value from a register to a value entry mechcanism in response to depression of a transfer key, and to selectively disable the register clearance operation which normally follows such transfer.

In order that the invention may be practiced by others it is disclosed in terms of an express embodiment, given by way of example only, and with reference to the accompanying drawing, in which:

FIGURE 2 is a right side view of the carriage and registers, the value entry mechanism, the back transfer key, and the value storage mechanism;

FIGURE 3 is a right side view of the back transfer structure;

FIGURE 3A shows a portion of the mechanism of FIG. 3 in a latched position;

FIGURE 4 is a right side view of the middle dial clearance key and lock key, and associated linkage; and FIGURE 5 is an alternate embodiment of the value mechanism shown in FIGURE 3.

*General description*

Figure 1:
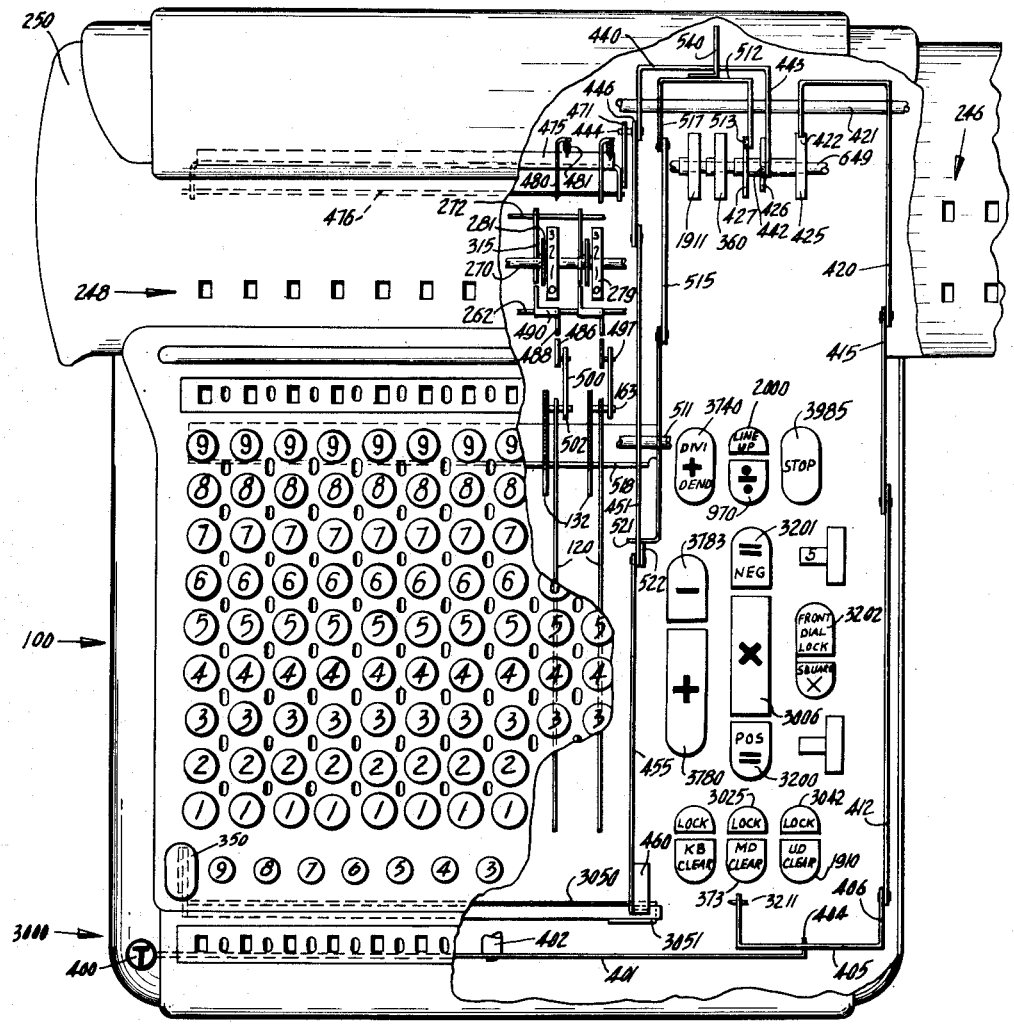
FIGURE 1 is a top view (partially broken away) of a calculating machine embodying the invention.

The invention is disclosed as embodied in the commercially known Marchant Deci-Magic ® calculating machine, the basic elements of which are disclosed in U.S. Patent No. 2,271,240 with further improvements in multiplication mechanisms disclosed in copending U.S. patent application Serial No. 617,454. The machine comprises: a counter or upper dial numeral wheel register 246 (FIG. 1) and an accumulator or middle dial numeral wheel register 248 of the crawl carry type contained in a carriage 250, a value entry mechanism including a keyboard 100, and actuators 172 (FIG. 2) for the numeral wheels. Conventional carriage shifting mechanisms, clearing mechanisms, and operating controls are also provided as disclosed in the above mentioned patent and application.

The sequence of conducting the various calculating operations with the calculating machine is adequately disclosed in the above mentioned patent application; however, a multiplying operation will be described since it discloses one method of accumulating a value in the numeral wheel register. Such accumulated values are used in back transfer operations.

A multiplier value is first entered in the keyboard 100 (FIG. 1) and is thereafter transferred to a value storage mechanism 3000 (FIGS. 1 and 2) by depression of a multiplier value entry or "X" key 3006 (FIG. 1). Depression of the "X" key also clears the keyboard. A multiplicand value is then entered in the keyboard and upon depression of a multiply operation initiating or "Pos=" key 3200, the middle dials 248 and the upper dials 246 are automatically cleared, followed by a multiplying operation during which the product appears in the middle dials. The multiplier value is normally cleared from the value storage mechanism 3000 at the end of the multiplying operation; however, it may be retained as a constant by depressing a front dial lock key 3202.

The value standing in the middle dials may be transferred to the value selection mechanism by depression of a transfer key 400. Such depression engages a transfer clutch which, as described hereinafter, clears the keyboard and the value selection mechanism of any value standing therein and then adjusts the ordinal value selection bars in accordance with the value standing in the numeral wheels ordinally aligned therewith. The selection bars are locked in this position and control the numeral wheel actuators during subsequent calculating operations. Alternatively, the value standing in the selection bars may be stored in the value storage mechanism. After the back transfer operation is completed the transfer clutch automatically initiates clearance of the middle and upper dials, or both, which clearance may be selectively disabled.

*Value entry mechanism*

The value entry mechanism comprises a plurality of rows of keys, each row in turn controlling selection mechanism which is set, upon depression of a key, to a mechanical representation of the value selected. During a calculating operation initiated by a plus key 3780 (FIG. 1), minus key 3783, dividend key 3740, divide key 970, or Pos= key 3200, the ordinal numeral wheel actuators are adjusted by power means in accordance with the setting of the respective selection mechanisms. At the conclusion of the calculating operation the depressed keys are released and the selection mechanism in each order is returned to the normal condition. In the normal condition, the selection mechanism stands in a value position representative of zero.

Nine keys 100 (FIGS. 1 and 2) are provided in each of ten rows, which keys are mounted in the usual manner for up and down sliding movement within conventional key section frames 101. In FIGURE 2 the "9" key is shown in depressed position. When a key 100 is depressed a spring 102 is compressed between a shoulder (not shown) on the keystem and the lower key frame 101, thus tending to raise the key to its initial position; however, upon depression of a key, a camming lug 116 on each keystem passes through respective apertures on the lower key frame 101 and a lock bar 117, and when the key reaches the fully depressed position the lock bar snaps over the top of the lug (in response to a spring not shown) and locks the key in depressed position. Depression of any other key 100 in the same row releases the previously locked key and locks down the depressed key.

A value selection mechanism comprising in part a selection bar 120 underlies the bottoms of the keystems 103 in each order. Each selection bar is mounted for substantially horizontal swinging movements relative to the keys by means of a pair of supporting pendants 128 which are pivotally mounted on studs 128a fastened to the framework of the machine. Nine notches 131 are cut in each selection bar, which notches correspond to decimal values "1" to "9." Opposed cam surfaces diverge from each notch to form V shaped apertures 130, one of which underlies each keystem. The distance between successive notches is slightly less than the distance between successive keystems, and the arrangement is such that depression of a key moves the selection bar 120 one to nine increments to the right, the number of increments depending on the value of the key depressed.

The rightmost end of the selection bar 120 has an inverted U shaped notch cut therein which embraces a pin 163 fixed on a selection segment 132, which is freely mounted on a fixed shaft 137. The opposite ends of the selection segment 132 carry respective gear segments 138 and 139. Gear segment 138 meshes with a gear 145 fixed to an indicator dial 140 and gear segment 139 meshes with a selection gear 151 (FIGS. 2 and 3) forming a portion of an ordinal selection unit generally indicated at 146. Each indicator dial is urged to move in the counterclockwise direction by a torsion spring 142.

It will therefore be evident that upon depression of any value selection key 100, the corresponding selection bar 120 will be moved a discrete incremental amount, and through the selection segment 132 will adjust the indicator dial 140 and the selection unit 146 in accordance with the value selected. The selection unit 146 in each order comprises a plurality of cam units, not shown herein but disclosed in the above mentioned patent, which cam units are subsequently sensed to adjust the actuating mechanism in each order in accordance with the value selected. Alternatively, values entered into the keyboard 100 may be transferred as is described hereinafter to the value storage mechanism 3000 (FIG. 2).

*Transfer of keyboard value to value storage mechanism*

It will be recalled that the value selection keys 100 (FIG. 2), when depressed, move respective selection bars 120 to value representative positions. Each such bar has a pin and slot connection 3003 with a respective lever 3001 pivoted on a shaft 3002 fixed in the framework of the machine. Each selection bar 120 will stand at a value position representative of 0 or 1 through 9, thus locking an ear 3004 of lever 3001 in a position corresponding to the value entered in the respective order of the keyboard 100. In FIGURE 2, the value selection key corresponding to the number 9 is shown in depressed position, and the selection bar 120 and associated mechanism is also shown in the value position representative of 9, thus locking the ear 3004 in a position representative of the value 9. Upon depression of the "X" key 3006 (FIG. 1) a bail 3007, is moved in a clockwise direction about a shaft 3291, as fully explained in the above mentioned patent application, and a plurality of ordinally arranged step cams 3005 (FIG. 2) are thereby released. The step cams 3005 rock clockwise until one of ten steps 3005a on each cam contacts a respective ear 3004. A second step cam 3204 is urged counterclockwise about the shaft 3291 by a torsion spring 3205a, which interconnects the step cams 3005 and 3204 in each order, to the extent that an enlarged portion of a stud 3206 carried by the step cam 3204 contacts a surface 3207 on an extension of the step cam 3005. Thus, these two step cams normally act as integral parts and move in unison with each other about the shaft 3291. A link 3208 is connected to the stud 3206 of each step cam 3204 and the forward end of the link in each order is connected to a pin 3209 fixed on a lower arm of a gear segment 3210 which is pivoted on a fixed shaft 3211.

The gear segment 3210 is continually meshed with a gear 3212 fixed to a front dial 3220. The front dials are each freely pivoted on a transverse shaft 3213. A torsion spring 3214 urges each front dial in a counterclockwise direction and, through the gear connection and the articulated linkage just described, constantly exerts a force tending to move the step cam 3204 in a clockwise direction. Such movement is prevented by the transverse bail 3007 which normally stands in the position shown in FIGURE 2. However, upon depression of the "X" key 3006, the bail 3007 is rocked clockwise and permits the aforedescribed movement of the step cams 3005 and 3204 to cause rotation of the front dials 3220 to respective value representative positions corresponding to the value representative positions of the selection bars 120.

*Unlocking the keyboard*

Depressed value selection keys 100 of the keyboard are unlocked by movement of an unlock bail 3050—3051. This bail is moved by an unlock key 350 (FIGS. 1 and 2), and by operation of the transfer clutch. The keyboard unlock key 350 is mounted for up and down movement on the framework of the machine by a conventional pin and slot arrangement 374. The unlock key is urged to the normally raised position by a spring 3046. A keyboard clearance bail lever 3048 is pivotally mounted to a fixed frame stud 3049 and is connected by a pin 3047 to a slot in the key 350. The clearance bail lever 3048 carries the two clearance bails 3050 and 3051. The clearance bail 3050 extends across the keyboard and is positioned adjacent the left end of each lock bar 117. Depression of the keyboard unlock key 350 moves the lever 3048 and clearance bail 3050 clockwise and moves each lock bar 117 toward the right to release any key 100 which may be locked in depressed position.

It will be noted that depression of the keyboard unlock key 350 causes the bail 3051 to contact and move a hook 460 rightward. The hook 460 is formed on a link 455 (FIGS. 2 and 3) and is moved by the key 350 to rock a selection pawl latch 523 clockwise. The selection pawl latch and related structure is described in detail hereinafter in connection with the locking of selection unit gears.

*Numeral wheel actuators*

The numeral wheels 279 (FIGS. 1 and 3) of the accumulator register are driven by an actuating mechanism 172 (FIG. 2). The mechanism comprises in each order a gear 189 which is driven an amount proportional to the value selected for that order.

The gear 189 is driven by means of a proportional gear drive comprising in each order a plurality of entrained gears which are selectively engaged, under the control of the selection unit 146. The engaging operation is carried out under power during the setting clutch cycle, and upon engagement of a main (actuator drive) clutch the actuator mechanism 172 in each order is advanced by an amount which is proportional to the value entered in the associated order of the keyboard.

Gear 189 underlies a gear 271 in the carriage 250, forming a portion of a gear train to a respective numeral wheel 279. Normally, gear 271 stands in the position shown in FIGURE 2 where it is disengaged from the actuator gear 189; however, during all calculating operations the register carriage is "dipped" during a setting cycle as disclosed in the last mentioned patent, into a position where gear 271 meshes with gear 189 and transmits incremental movement from the ordinal actuator to the numeral wheel 279. At the end of each ordinal actuation the carriage is returned to the position shown, thus disengaging the gears 271 and 189 to permit the carriage to be shifted without interference between the gears. This actuating mechanism is more fully described in the previously mentioned Patent No. 2,271,240.

Accumulator register

The accumulator register, also referred to as the middle dials 248 (FIGS. 1 and 2), comprises a plurality of ordinally arranged numeral wheels 279 (FIGS. 1, 2 and 3) mounted in the carriage 250 for shifting movement relative to the actuating mechanism. Power for actuation is derived from a main clutch and a setting clutch 430 (FIG. 2) disclosed in said patent. A "crawl carry" transfer gearing between adjacent numeral wheels operates simultaneously with actuation to transmit partial increments of carry from each numeral wheel to its adjacent higher order numeral wheel as described in said patent. At the end of each ordinal actuating operation the numeral wheels are moved to positions of full digital display. The middle dials 248 register products, sums, differences, and individual values as the case may be.

Back transfer mechanism

A transfer key 400 (FIGS. 1 and 2) is carried on the left end of a lever 401 which is pivotally mounted on a stud 402 fixed to the front framework of the machine. The right hand extremity of lever 401 carries a projection 404 which underlies a bail 405 having an arm 406 which is pivotally mounted on the shaft 3211. Depression of the transfer key 400 rocks the bail 405 and arm 406 (FIG. 2) clockwise about shaft 3211.

The arm 406 (FIG. 2) carries a pin 408 which resides in an L shaped slot 410 on a link 412. The pin 408 and slot 410 in combination with a frame stud 413 and a cam surface 414 on the link 412, form a conventional self-releasing connection between the link 412 and the arm 406.

Link 412 is pivotally connected to a bellcrank 415 (FIG. 3). Bellcrank 415 is pivotally mounted on a frame stud 416 and carries a stud 417 which is embraced by a bifurcated end of a transfer clutch engaging lever 420. The clutch engaging lever 420 is pivotally mounted on a shaft 421 and carries a dog 422 which is moved counterclockwise upon transfer key 400 depression to engage the transfer clutch 425 (FIG. 1).

An interlock lever 393 (FIG. 3) is fixed to a shaft 386 and is provided to prevent engagement of the transfer clutch during certain other machine operations. Such an interlock is disclosed in U.S. Patent No. 2,271,240 (particularly with reference to FIGURE 28).

The patent discloses the manner in which the shaft 386 is rocked clockwise during the operation of either the setting clutch 430 (FIG. 2) mounted on a shaft 431 (FIGS. 2 and 3), a main clutch mounted on a shaft 429 (FIG. 3), the register clear clutches 360 and 1911 (FIG. 1) or the carriage shift clutch.

Clockwise movement of the interlock lever 393 moves an ear 419 below a projection 418 of the bellcrank 415 to thereby block movement of the bellcrank 415 should an attempt be made to depress the transfer key. The engagement of the transfer clutch 425 is therefore prevented during the operation of any one of the described clutches. Similarly, during engagement of the transfer clutch 425, projection 418 is rocked clockwise from the position shown and stands in front of ear 419, thereby preventing operation of any of the above mentioned clutches.

The transfer clutch 425 (FIG. 1) is a one revolution clutch of the type disclosed in U.S. Patent 2,271,240 and is driven by a motor driven power shaft 649. Connected to the transfer clutch 425 are a transfer cam 426 and a pawl cam 427 (FIGS. 1 and 3). Several distinct functions occur in the following sequences under the control of the transfer and pawl cams:

(1) Automatic clearing of the keyboard,
(2) sensing and transferring values into the selection units,
(3) locking of selection unit gears, and
(4) selective clearing of the registers.

The mechanisms which perform the foregoing functions are described below.

Automatic clearing of the keyboard

The transfer cam 426 (FIGS. 1 and 3) is rotated once each time the single cycle transfer clutch 425 is engaged. A cam follower 442 is carried by one arm of a bail 440 (FIGS. 1 and 3) which is pivotally mounted on shaft 421. A second arm 443 of the bail 440 carries a stud 444 and the arrangement is such that the transfer cam follower 442 and stud 444 are first moved clockwise and then counterclockwise about shaft 421 during a single cycle of operation of the transfer cam 426.

A lever 446 is pivotally mounted on a shaft 447 and the rightmost arm thereof overlies the stud 444. Movement of the stud 444 with the transfer cam follower bail 440 causes the lever 446 to rock counterclockwise about shaft 447. Lever 446 is pivotally connected at 450 to a link 451. A slot 452 formed in the left end of link 451 embraces a stud 453 fastened to the right end of the link 455 (FIGS. 2 and 3).

The left end of link 455 is provided with the hook 460 (FIGS. 2 and 3) which lies adjacent the keyboard clearance bail 3050. Links 451 and 455 are moved rightwardly by lever 446 and thus move the keyboard clearance bail 3050 clockwise about pivot pin 3049 to clear the keyboard. Thus, any depressed keys 100 are released automatically by the linkage just described during the first portion of a transfer cam rotation.

Sensing and transferring values into the selection units

The previously mentioned stud 444 (FIG. 3) on arm 443 of the transfer bail resides in a slot 470 in a lever 471. Lever 471 is pivotally mounted at 447 and the leftmost end thereof carries a pin 472 which is embraced by a slot cut in an arm 473 of a bail 475. The bail 475 is pivotally mounted on a shaft 476 and is extended across the ten orders of the keyboard. A second arm, similar to arm 473, supports the opposite end of the bail 475.

A plurality of levers 480, one for each order (FIGS. 1 and 3), are pivoted on shaft 476 and are connected to the bail 475 by respective springs 481. Thus, when the bail is rocked clockwise by the transfer cam each lever 480 is yieldably moved clockwise about shaft 476. Each lever 480 operates a respective sensing mechanism for determining the value registered in a corresponding order of the accumulator register 248.

For this purpose, each lever 480 is pivotally connected by a short link 485 to a sensing lever 486 which is pivotally mounted on a shaft 487. The upper end of each sensing lever 486 (FIGS. 1 and 3) lies adjacent an arm 488 of a sensing bail 490. The sensing bails 490 are pivoted on a shaft 262 which is fixed in the carriage of the machine, there being one bail 490 for each order of the accumulator register.

The twenty order accumulator register 248 (FIGS. 1 and 2), hereinafter referred to as the middle dials, is of the crawl carry type fully disclosed in U.S. Patent No. 2,271,240, and each order includes a numeral wheel 279, a snail cam 281 attached thereto, and a snail cam follower 315 having a roller 316. Each ordinal snail cam follower 315 is pivotally mounted on a shaft 272. It will be apparent that the individual snail cams angularly move with respective numeral wheels to establish a mechanical representation of the value standing in an associated numeral wheel.

The ten middle dial orders which are positioned adjacent the ten sensing levers 486 are the only register orders which are sensed. The sensing of these orders is accomplished by the previously described linkage which rocks the individual sensing levers 486 clockwise about the shaft 487 to cause the upper end of each lever 486 to contact the arm 488 and move the sensing bail 490 counterclockwise. A surface 491 on each sensing bail 490 contacts the lower extremity 317 of each snail cam follower 315 and thus each sensing lever 486 is adjusted to a position representative of the value standing in the associated numeral wheel 279.

Each sensing lever 486 carries a stud 497 which resides in a slot 498 formed in an interponent 500. Each of the ten interponents is pivoted on a shaft 501 and is formed with a projection 502 which overlies the stud 163 (FIGS. 1, 2 and 3) carried by the selection segment 132. Clockwise movement of a sensing lever 486 causes the respective interponent 500 to rock a proportional amount in a counterclockwise direction about shaft 501 and the projection 502 moves the selection segment counterclockwise about the shaft 137. The projection 502 also moves the selection bar 120 connected to the stud 163, a proportional amount which corresponds to the value displayed in the respective numeral wheel 279.

The selection bars 120 and selection segments 132 are thus moved distances which represent the operand value standing in the middle dials 248 and, through the gear segments 138, set the corresponding operand value in the check dials 140, while the gear segments 139 set the corresponding operand value in the selection unit gears 151.

The selection unit gears 151 are locked in this position, as described hereinafter, and the levers 480 are each restored to the initial position shown (FIG. 3) during the final portion of a transfer cam 426 rotation when the bail 475 rocks counterclockwise and contacts a shoulder 505 formed on each lever 480.

With the value standing in the selection bars 120 the "X" key 3006 (FIG. 1) may be depressed to cause the value to be transferred from the selection bars to the front dials 3220 of the value storage mechanism 3000, as previously described.

*Locking of selection unit gears*

Ten selection pawls 510 (FIG. 3) are pivoted on a shaft 511 and are each rocked to engage a respective selection unit gear 151 to lock the respective transferred values in the selection units 146 even though the sensing levers 486 and levers 480 are restored by the transfer cam. The respective values remain locked in the selection units 146 until cleared by depression of the keyboard unlock key 350 (FIGS. 1 and 2), or until the transfer key is again depressed to transfer a second value into the selection units.

The pawl cam 427 is driven by the transfer clutch 425 and rocks a pawl cam follower bail 512 counterclockwise near the end of the single cycle of rotation. The follower bail 512 (FIGS. 3 and 4) is pivoted on the shaft 421 and carries a pawl cam roller 513 on one arm of said bail. A second follower bail arm 517 is pivotally connected at 514 to a link 515 which, in turn, is pivotally connected to a lever 516. Lever 516 is pivotally mounted on the shaft 511 and carries a bail 518 which is moved in a counterclockwise direction each time the pawl cam 427 is rotated.

The bail 518 (FIGS. 1 and 3) extends across the machine and is positioned adjacent a nose 519 of each of the ten pawls 510. If desired, a leaf spring (not shown) may be placed between each nose 519 and the bail 518 to provide a small amount of resiliency between the bail 518 and the respective pawls 510. The lever 516 has an arm 520 which carries an ear 521 and moves in the counterclockwise direction against the urging of a spring 526 attached thereto. The ear 521 on arm 520 thus moves downwardly until it passes below the lower end 522 of a pawl latch lever 523. The pawl latch lever 523 is pivotally mounted on a frame stud 524 and is spring urged to move over the ear 521 by a spring 525, to the extent permitted by a frame stud 527. The pawl latch lever 523 thereby locks the arm 520 and bail 518 (FIG. 3a) in the counterclockwise position and locks the pawls 510 in engagement with the selection unit gears 151. The values set into the selection units 146 (FIGS. 2 and 3) are thus locked into said selection units during the final portion of a single rotation of the transfer clutch 425.

It will be recalled that two links 451 and 455 (FIG. 3) are moved rightwardly at the beginning of rotation of transfer cam 426 to clear the depressed value entry keys 100 of the keyboard. The upper end of the pawl latch lever 523 is pivotally connected to the pin 453 and rightward movement of the links and the pin 453 therefore causes the pawl latch lever 523 to rock clockwise and move from above ear 521 to release the pawls 510. When the pawls 510 are disengaged from the selection unit gears 151 the selection segments 132, the selection bars 120, and the interponents 500 are all released and urged by the torsion spring 142 connected to each check dial to return to the initial or cleared position shown in FIGURE 3.

*Selective clearance of the registers*

Optional clearance of either or both of the carriage registers occurs at the end of the transfer operation. Mechanism is provided which is powered by the pawl cam follower bail 512 (FIG. 3), which can be selectively enabled or disabled to determine whether neither, one, or both the carriage registers are cleared.

A middle dial clear clutch 360 (FIG. 1) and an upper dial clear clutch 1911 are provided on the power shaft 649, as is fully disclosed in U.S. Patent No. 2,271,240. The patent discloses a middle dial clutch dog bail 379 (FIGS. 3 and 4) which moves and engages the middle dial clear clutch 360, and an upper dial clutch dog bail 1913 which moves and engages the upper dial clear clutch 1911.

A member 540 (FIGS. 3 and 4) is fixed to the pawl cam follower bail 512. A hook 541 (FIG. 4) is pivotally connected at 542 to the member 540. The hook is urged to overlie the bail 379 by a spring 543. When the pawl cam 427 rotates, the hook 541 pulls bail 379 toward the right and engages the middle dial clear clutch 360. The automatic clearance of the middle dials 248 may be selectively disabled by moving the hook 541 from engagement with bail 379. For this purpose a pin 545 is provided on a lever 546 which is pivoted at 547. The lever 546 is directly controlled by a lock key 3025 (FIGS. 1 and 4) associated with a middle dial clear key 373. The clear key 373 is mounted for up and down movement within the framework by conventional pin and slot connections 374 and 375. A slot 3011 formed in lower end of the clear key 373 shank overlies a pin 3012 which, when moved downward, initiates the operation for clearing the middle dials 248. The conventional structure operated by the pin 3012 for automatically clearing the middle dials at the end of certain calculations, is fully disclosed in the above mentioned patent application Serial No. 617,454.

The lock key 3025 is provided to prevent automatic clearing operations. Key 3025 is mounted for up and down movement beside the clear key 373 by the pin and slot connection 374 and also by a pin 376. The lock key 3025 is urged to the raised position shown by a spring 377. A lock key latch 3031 is pivotally mounted on the pin 374 and is urged by a spring 378 to rock in a clockwise direction. The lock key 3025 has a shelf 3032 which, when moved downward, is locked under the lower edge of the lock key latch 3031 by the latch moving over the shelf.

Depression of the lock key 3025 causes a stud 380 on the key to move a lever 381 counterclockwise about a pivot shaft 382. Lever 381 is connected by a link 383 to the lever 546 which controls the hook 541 as previously described. Thus, upon depression of the lock key 3025, automatic clearance of the middle dials 248 during a back transfer operation is prevented.

The lock key latch 3031 is disengaged from the shelf 3032 by the depression of the clear key 373 to permit the restoration of the lock key and associated linkage to the position shown in FIGURE 4. The clear key shank carries a stud 386 which overlies a cam surface 387 of the lock key latch 3031 and moves the latch to release the lock key 3025 whenever the clear key 373 is depressed.

An upper dial clear key 1910 and an upper dial lock key 3042 (FIG. 1) are constructed in the manner just described for the middle dial clear key 373 and the middle dial lock key 3025. It will be apparent to those skilled in the art that a hook similar to hook 541 (FIG. 4) may be pivoted in the hole 590 in the member 540, and controlled by the upper dial clear key 1910 and lock key 3042, to provide selective clearance of the upper dials 246.

*Alternate embodiment of value transferring mechanism*

An alternate embodiment of the structure for operating the sensing levers 486 is shown in FIGURE 5. The mechanism for operating the lock pawls 510 is the same as that shown in FIGURE 3. A transfer cam 700 is rotated in a counterclockwise direction with the shaft 649 each time the transfer clutch 425 (FIG. 1) is engaged. The transfer cam 700 is engaged by a roller 701 carried by an arm of a transfer bail 702. The bail 702 is urged by a spring 703 to move in a clockwise direction about the shaft 421. An arm 705 of the transfer bail 702 is pivotally connected to a link 706. An elongated slot 707 is formed in the forward end of link 706 and the slot 707 embraces a pin 708. The pin 708 is carried by an arm 709 of a bail 712 which performs the same function as the bail 475 (FIG. 3).

The bail 712 overlies each of ten levers 714 and is rocked counterclockwise about the pivot shaft 476 each time the transfer cam 700 is rotated. Each lever 714 is connected to the bail 712 by a tension spring 715 and is pivotally connected at 716 to a link 717. The links 717 are each pivotally connected at 720 to an extension 721 of a respective interponent 500.

Each extension 721 overlies the pin 163 (FIGS. 1, 2, 3 and 5) carried by the selection segment 132 of that keyboard order. Movement of the bail 712 causes the levers 714 to yieldably rock counterclockwise and, through the link 717 connection from each lever to the interponent 500, causes each interponent to move counterclockwise about the pivot shaft 501. The pin 497 of the sensing member engages the slot 498 of the interponent and movement of the interponent 500 therefore causes the sensing lever 486 to move clockwise about shaft 487 and sense the value standing in the associated register numeral wheel 279, as previously described.

Following sensing of the numeral wheel the values are locked in the selection unit gears 151 by operation of the pawl cam 427 (FIG. 3) and the lock pawls 510.

A pin 730 carried by the transfer bail arm 705 underlies an arm of a keyboard clear lever 732. The keyboard clear lever 732 is pivotally mounted on the shaft 447 (FIGS. 3 and 5) and is pivotally connected at 733 to the link 451 (FIGS. 3 and 5). Movement of the transfer bail 702 at the beginning of rotation of a transfer cam 700 causes the pin 730 to move the lever 732 counterclockwise about shaft 447. The link 451 is thus moved toward the left and causes the depressed keys 100 of the keyboard to be released at the beginning of a transfer cam rotation, as previously described.

The invention claimed is:

A calculating machine having a numeral wheel register; adjustable actuators for driving the numeral wheels; a selectively settable value entry mechanism for adjusting the actuators; and normally enabled detents for holding the value entry mechanism in selectively set position; in combination with means for setting the value entry mechanism to a value corresponding to a value standing in the numeral wheel register, comprising: a step cam carried by each numeral wheel for rotation therewith to respective value representative positions; a rockable follower for each step cam; a plurality of ordinal members each mounted for rocking movement about a fixed center; a shoulder on each member overlying an element of the value entry mechanism and also having a camming surface; an intermediate device in each order also mounted for rocking movement about a fixed center and having an extension for determining the extent of rocking movement of the follower; a stud carried by the device for cooperation with said camming surface; a normally disabled means for moving the member, the intermediate device and the cam follower to the extent permitted by contact of said cam follower with said cam; and a cyclically operable means for first disabling the detents, enabling the moving means and then re-enabling the detents, to thereby set and lock said members and the associated value entry mechanism in accordance with the value representative positions of the respective numeral wheels.

References Cited in the file of this patent

UNITED STATES PATENTS

| | | |
|---|---|---|
| 2,714,989 | Ellerbeck | Aug. 9, 1955 |
| 2,794,596 | Ellerbeck | June 4, 1957 |

FOREIGN PATENTS

| | | |
|---|---|---|
| 203,473 | Switzerland | June 16, 1939 |